(12) United States Patent
Lee et al.

(10) Patent No.: US 10,488,889 B2
(45) Date of Patent: Nov. 26, 2019

(54) ELECTRONIC DEVICE INCLUDING COMPONENT TRAY

(71) Applicant: Samsung Electronics Co., Ltd., Gyeonggi-do (KR)

(72) Inventors: Kyongho Lee, Gyeongsangbuk-do (KR); Dongchul Song, Gyeongsangbuk-do (KR); Taehwan Kang, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/106,734

(22) Filed: Aug. 21, 2018

(65) Prior Publication Data
US 2019/0064884 A1 Feb. 28, 2019

(30) Foreign Application Priority Data
Aug. 22, 2017 (KR) .......................... 10-2017-0106322

(51) Int. Cl.
*G06F 1/16* (2006.01)
*G06K 13/08* (2006.01)
*H01R 13/52* (2006.01)
*H04M 1/02* (2006.01)

(52) U.S. Cl.
CPC .......... *G06F 1/1656* (2013.01); *G06F 1/1626* (2013.01); *G06F 1/1637* (2013.01); *G06F 1/1658* (2013.01); *G06K 13/0812* (2013.01); *H01R 13/5213* (2013.01); *H04M 1/02* (2013.01); *H04M 1/026* (2013.01); *H04M 2250/14* (2013.01)

(58) Field of Classification Search
CPC .............. H01R 13/5213; G06F 1/1656; G06K 13/0812
See application file for complete search history.

(56) References Cited

U.S. PATENT DOCUMENTS

| 5,255,965 | A  | * | 10/1993 | Chen ...................... | A47B 81/06 16/260 |
|---|---|---|---|---|---|
| 6,267,608 | B1 | * | 7/2001 | Yagi ..................... | H01R 13/447 439/142 |
| 6,674,639 | B2 | * | 1/2004 | Wang .................... | G06F 1/1626 361/679.32 |
| 6,757,160 | B2 | * | 6/2004 | Moore .................. | G06F 1/1616 361/679.55 |
| 7,501,573 | B2 | * | 3/2009 | Balfour, Jr. ............ | H02G 9/025 109/53 |

(Continued)

FOREIGN PATENT DOCUMENTS

JP 9-290198 A 11/1997

*Primary Examiner* — Adrian S Wilson
(74) *Attorney, Agent, or Firm* — Cha & Reiter, LLC.

(57) ABSTRACT

According to certain embodiments, an electronic device includes a housing including a front plate, a rear plate facing in an direction opposite to that of the front plate, and a side member enclosing a space between the front plate and the rear plate, wherein the side member includes a through hole for insertion of an external object; and a flexible member attached to an inner surface of the side member and configured to block at least a portion of the through hole and configured to permit an external object to bend the flexible member, thereby allowing the external object to enter the through hole.

15 Claims, 20 Drawing Sheets

(56) References Cited

U.S. PATENT DOCUMENTS

| | | | | |
|---|---|---|---|---|
| 8,186,726 B2* | 5/2012 | Zuo | ............... | H04M 1/0274 |
| | | | | 292/1 |
| 8,446,713 B2* | 5/2013 | Lai | ............... | H01H 13/86 |
| | | | | 361/679.01 |
| 8,591,240 B2* | 11/2013 | Jenks | ............... | G11B 17/00 |
| | | | | 439/159 |
| 8,614,897 B2* | 12/2013 | Tang | ............... | G06K 13/08 |
| | | | | 361/752 |
| 9,240,292 B1* | 1/2016 | Lapetina | ............... | H01H 9/04 |
| 9,625,944 B2* | 4/2017 | Weber | ............... | G06F 1/1656 |
| 9,787,342 B2* | 10/2017 | Kole | ............... | H04B 1/3816 |
| 2009/0256364 A1* | 10/2009 | Gadau | ............... | G06F 1/1616 |
| | | | | 292/128 |
| 2011/0255252 A1* | 10/2011 | Sloey | ............... | H04B 1/3816 |
| | | | | 361/752 |
| 2012/0067711 A1* | 3/2012 | Yang | ............... | H01H 13/86 |
| | | | | 200/341 |
| 2013/0309885 A1* | 11/2013 | Liu | ............... | H01R 13/629 |
| | | | | 439/153 |
| 2014/0029206 A1* | 1/2014 | Wittenberg | ............... | H05K 1/18 |
| | | | | 361/728 |
| 2014/0078682 A1 | 3/2014 | Jenks | | |
| 2014/0092532 A1* | 4/2014 | Kole | ............... | H04M 1/0249 |
| | | | | 361/679.01 |
| 2014/0177144 A1* | 6/2014 | Wu | ............... | G06F 1/1613 |
| | | | | 361/679.01 |
| 2014/0218877 A1* | 8/2014 | Wei | ............... | H04B 1/3816 |
| | | | | 361/752 |
| 2014/0362548 A1* | 12/2014 | Liu | ............... | G06F 1/16 |
| | | | | 361/754 |
| 2017/0025785 A1* | 1/2017 | Song | ............... | H01R 13/5213 |
| 2017/0238431 A1* | 8/2017 | Lee | ............... | H05K 5/0017 |
| | | | | 361/752 |

* cited by examiner

ELECTRONIC DEVICE INCLUDING COMPONENT TRAY

CROSS-REFERENCE TO RELATED APPLICATION(S)

This application is based on and claims priority under 35 U.S.C. § 119 to Korean Patent Application No. 10-2017-0106322, filed on Aug. 22, 2017, in the Korean Intellectual Property Office, the disclosure of which is incorporated by reference herein in its entirety.

BACKGROUND

Field of the Invention

The present disclosure relates to an electronic device having a structure for preventing a foreign material from entering through a through hole formed therein.

Description of the Related Art

Electronic devices may include an electronic appliance, electronic organizer, portable multimedia player, mobile communication terminal, tablet personal computer, video/audio device, desktop/laptop computer, and car navigation device or a device that performs a specific function according to an installed program. For example, an electronic device may output stored information as a sound or video. In recent years, because the degree of integration of electronic devices has increased and super high speed and large capacity wireless communication has become popular, various functions have been provided in one mobile communication terminal.

Given the degree of integration of the electronic devices, it is important to keep foreign material such as water and dust from entering the interior of the electronic device.

SUMMARY

The electronic device may include a case made of a metal material or a plastic material or a portion (e.g., an edge of the case) of the case. The electronic device may include a battery integrally fixed thereto.

The electronic device may provide security such as user authentication using a Subscriber Identity Module card (SIM) or may increase storage capacity using a memory card. The electronic device may include a socket to attach or detach a SIM card and a memory card. The electronic device may mount the SIM card and memory card in a tray structure according to a structure thereof and insert the storage medium therein.

The electronic device may include a through hole for detaching the tray structure therefrom. A foreign material such as water and dust may enter from the outside into the electronic device through the through hole.

The present disclosure provides an electronic device having a structure that may prevent a foreign material from entering through a through hole formed therein.

In accordance with an aspect of the present disclosure, an electronic device, comprises a housing comprising a front plate, a rear plate facing in an direction opposite to that of the front plate, and a side member enclosing a space between the front plate and the rear plate, wherein the side member comprises an opening portion and a through hole adjacent to the opening portion; a touch screen display disposed between the front plate and the rear plate; a tray configured to be inserted into the space through the opening portion and having a form to carry a subscriber identification module (SIM); a socket disposed within the space and configured to accept the tray through the opening portion; a tray detachment structure disposed adjacent to the socket within the space and configured to push the tray out of the socket when the tray detachment structure is pressed by an external object inserted through the through hole; and a flexible member, disposed within the space and attached to the side member on a periphery of the through hole, the flexible member comprising a portion blocking at least a portion of the through hole, and configured to permit an external object to bend the flexible member, thereby allowing the external object to enter the through hole.

In accordance with another aspect of the present disclosure, an electronic device includes a housing including a front plate, a rear plate facing in an direction opposite to that of the front plate, and a side member enclosing a space between the front plate and the rear plate, wherein the side member includes a through hole for insertion of an external object; and a flexible member attached to an inner surface of the side member and configured to block at least a portion of the through hole. The flexible member may be bent by an external object inserted through the through holes so that the external object may be inserted into the space. The flexible member may include a fixed portion attached and fixed to the side member at a periphery of the through hole and a moving portion formed in a direction vertical to the fixed portion to block at least a portion of the through hole.

BRIEF DESCRIPTION OF THE DRAWINGS

The above features, and advantages of the present disclosure will be more apparent from the following detailed description in conjunction with the accompanying drawings, in which.

DETAILED DESCRIPTION

Figure 1:
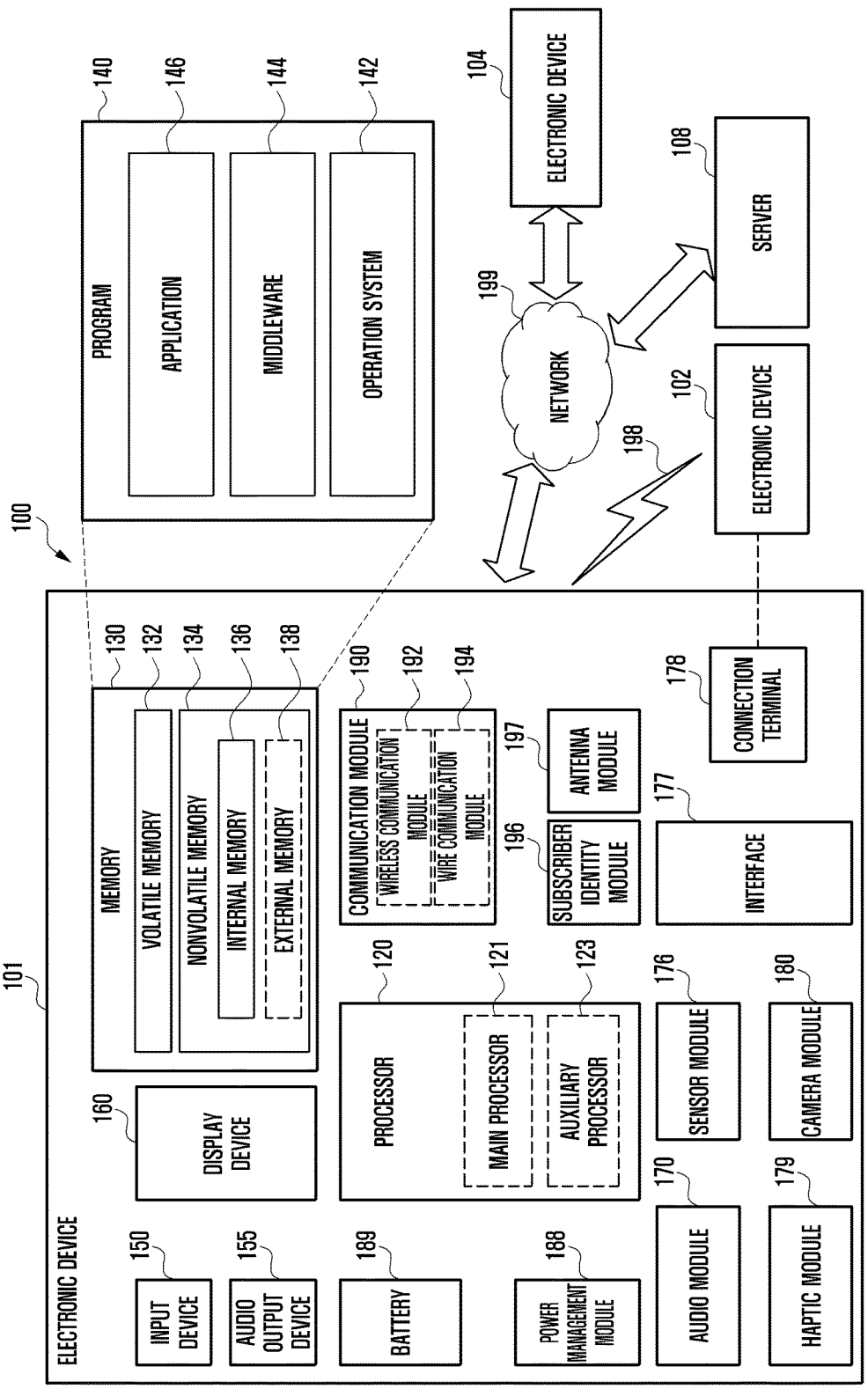
FIG. 1 is a block diagram illustrating a configuration of an electronic device in a network environment according to various embodiments.

FIG. 1 is a block diagram illustrating an electronic device 101 in a network environment 100 according to various embodiments. With reference to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

In certain embodiments, the SIM card 196 can be connected to the electronic device 101 by means of a tray that is inserted into a side portion.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
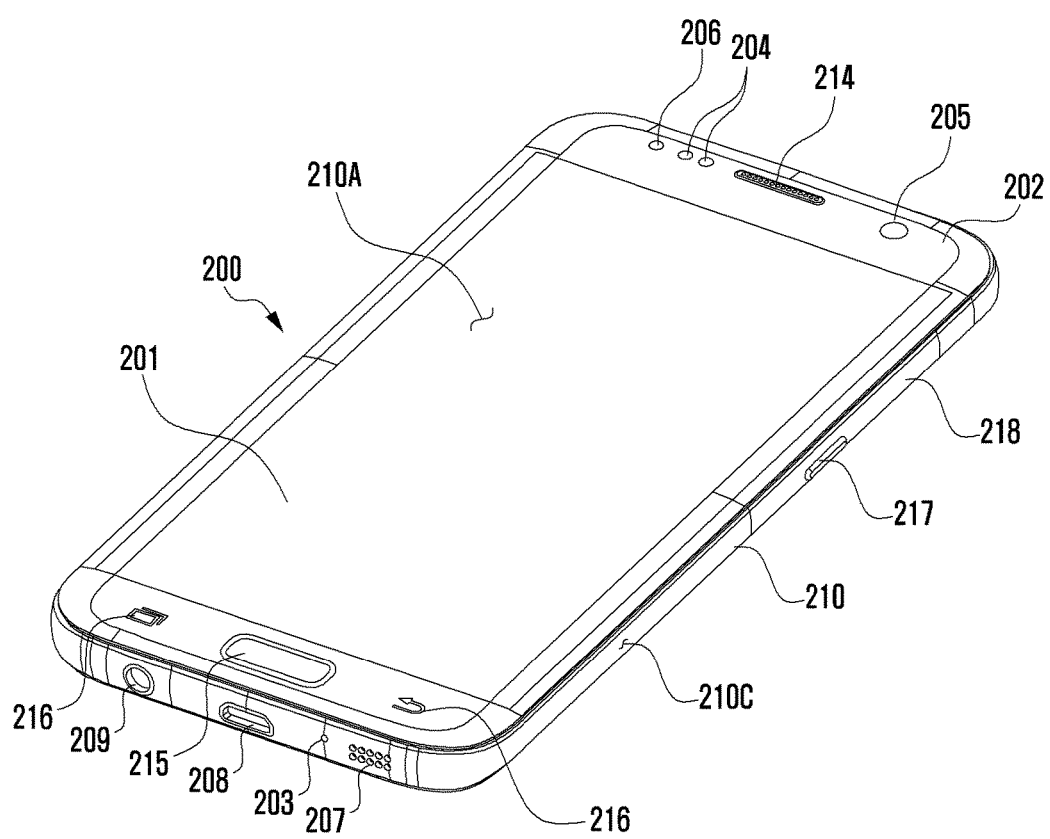
FIG. 2 is a perspective view illustrating a front surface of an electronic device according to an embodiment.
Figure 3:
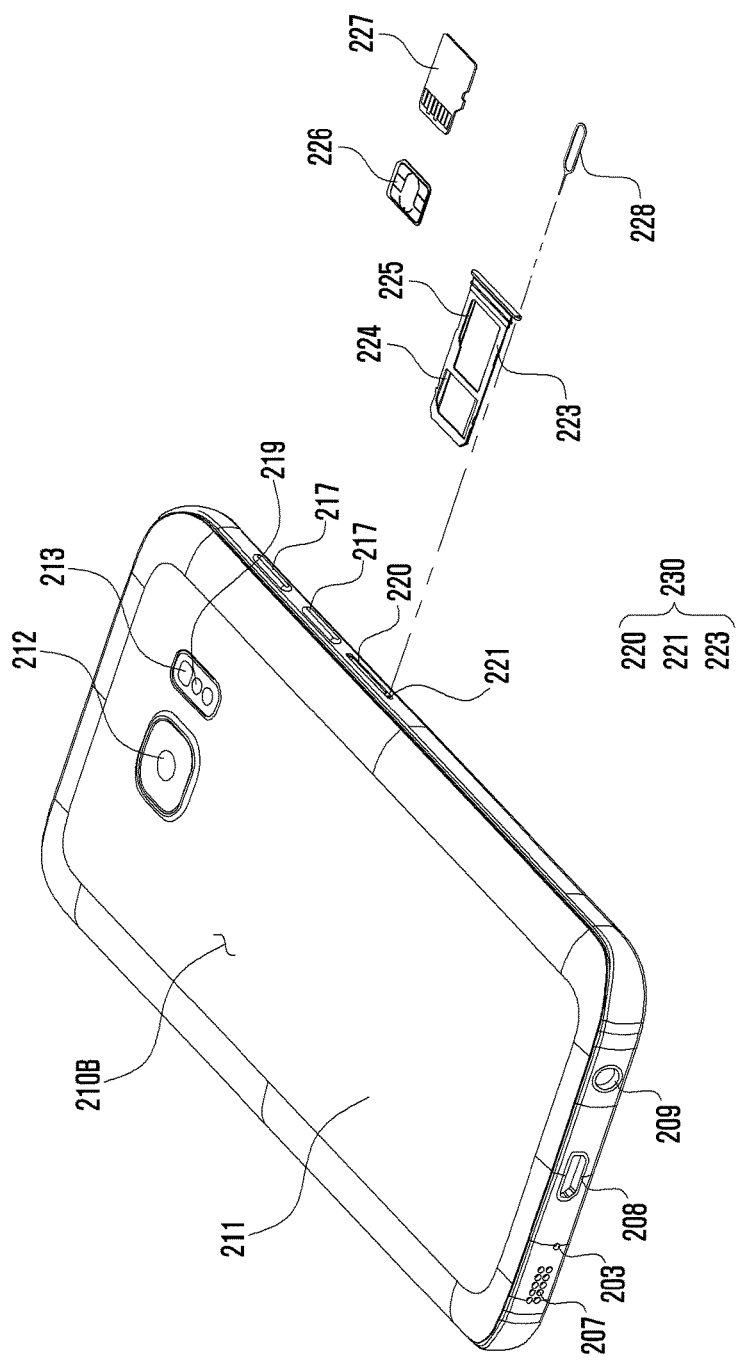
FIG. 3 is a perspective view illustrating a rear surface of the electronic device of FIG. 2.

FIG. 2 is a perspective view illustrating a front surface of an electronic device according to an embodiment. FIG. 3 is a perspective view illustrating a rear surface of the electronic device of FIG. 2.

With reference to FIGS. 2 and 3, an electronic device 200 according to an embodiment may include a housing including a first surface (or a front surface) 210A, a second surface (or a rear surface) 210B, and a side surface 210C enclosing a space between the first surface 210A and the second surface 210B. In another embodiment (not shown), the housing may indicate a structure formed with some of the first surface 210A, second surface 210B, and side surface 210C of FIG. 2. According to an embodiment, at least a portion of the first surface 210A may be formed with a substantially transparent front plate 202 (e.g., a polymer plate or a glass plate including various coating layers). The second surface 210B may be formed with a substantially opaque rear plate 211. The rear plate 211 may be formed with, for example, coated or colored glass, ceramic, polymer, and metal (e.g., aluminum, stainless steel (STS), or magnesium) or combinations of at least two of the materials. The side surface 210C may be coupled to the front plate 202 and the rear plate 211 and be formed with a side bezel structure (or a side member) 218 including a metal and/or a polymer. In some embodiments, the rear plate 211 and the side bezel structure 218 may be integrally formed and include the same material (e.g., a metal material such as aluminum).

According to an embodiment, the electronic device 200 may include a tray structure 230. For example, the tray structure 230 may include a tray 223 that loads storage media 226 and 227, an opening portion 220 for insertion of the tray 223, a through hole 221 adjacent to the opening portion 220, and a space between the front plate 202 and the rear plate 211 that receives the storage media 226 and 227. For example, the opening portion 220 may be disposed at the side member 218. For example, the tray 223 may be detachably coupled to the side member 218. The storage media 226 and 227 may include, for example, a subscriber identity module card (SIM card) 226 and a memory card 227 such as a secure digital card (SD card) or a micro SD card. According to an embodiment, the storage media 226 and 227 may be loaded at the tray 223, and the tray 223 that loads the storage media 226 and 227 may be inserted into a space between the front plate 202 and the rear plate 211 through the opening portion 220. For example, the space may include a socket configured to receive the tray 223. According to an embodiment, the tray 223 may include a portion 224 for loading the SIM card 226 and another portion 225 for loading the memory card 227.

According to an embodiment, in order to detach the tray 223 from the electronic device 200, in the side member 218, a through hole 221 may be formed at a portion adjacent to the opening portion 220. When an external object 228 (e.g., a detachment pin) is inserted through the through hole 221, the tray 223 may be detached. For example, at a space between the front plate 202 and the rear plate 211, at a portion adjacent to the socket configured to receive the tray 223, a tray detachment structure configured to detach the tray 223 when the external object 228 is inserted and pressed through the through hole 221 may be disposed.

According to an embodiment, the electronic device 200 may include at least one of a display 201, audio modules 203, 207, and 214; sensor modules 204 and 219; camera modules 205, 212, and 213; key input devices 215, 216, and 217; an indicator 206; and connector holes 208 and 209. In some embodiments, the electronic device 200 may omit at least one (e.g., the key input devices 215, 216, and 217 or the indicator 206) of the components or may further include other components.

The display 201 may be visible through, for example, a considerable portion of the front plate 202. The display 201 may be coupled to a touch detection circuit, a pressure sensor that measures intensity (pressure) of a touch, and/or a digitizer that detects a stylus pen of a magnetic field method or may be disposed adjacent thereto.

The audio modules 203, 207, and 214 may include a microphone hole 203 and speaker holes 207 and 214. A microphone for obtaining an external sound may be disposed within the microphone hole 203, and in some embodiments, a plurality of microphones may be disposed to detect a direction of a sound. The speaker holes 207 and 214 may include an external speaker hole 207 and a communication receiver hole 214. In some embodiments, the speaker holes 207 and 214 and the microphone hole 203 may be implemented into a single hole or a speaker (e.g., a piezo speaker) may not include the speaker holes 207 and 214.

The sensor modules 204 and 219 may generate electrical signals or data values corresponding to an operating state within the electronic device 200 or an external environment condition. The sensor modules 204 and 219 may include, for example, a first sensor module 204 (e.g., a proximity sensor), a second sensor module (not shown) (e.g., a fingerprint sensor) disposed at the first surface 210A of a housing 210, and/or a third sensor module 219 (e.g., a heart rate monitoring (HRM) sensor) disposed at the second surface 210B of the housing 210. A fingerprint sensor may be disposed at the second surface 210B as well as at the first surface 210A (e.g., a home key button 215) of the housing 210. The electronic device 200 may further include a sensor module (not shown), for example, at least one of a gesture sensor, gyro sensor, atmospheric sensor, magnetic sensor, acceleration sensor, grip sensor, color sensor, infrared (IR) sensor, biometric sensor, temperature sensor, humidity sensor, and illumination sensor 204.

The camera modules 205, 212, and 213 may include a first camera device 205 disposed at the first surface 210A of the electronic device 200, a second camera device 212 disposed at the second surface 210B, and/or a flash 213. The camera modules 205 and 212 may include at least one lens, an image sensor, and/or an image signal processor. The flash 213 may include, for example, a light emitting diode or a xenon lamp. In some embodiments, two or more lenses (wide angle lens and telephoto lens) and image sensors may be disposed at one surface of the electronic device 200.

The key input devices 215, 216, and 217 may include a home key button 215 disposed at the first surface 210A of the housing 210, a touch pad 216 disposed at a periphery of the home key button 215, and/or a side key button 217 disposed at the side surface 210C of the housing 210. In another embodiment, the electronic device 200 may not include some or all of the key input devices 215, 216, and 217, and the excluded key input devices 215, 216, and 217 may be implemented into other forms such as a soft key on the display 201.

The indicator 206 may be disposed at, for example, the first surface 210A of the housing 210. The indicator 206 may provide, for example, status information of the electronic device 200 in an optical form and include a light emitting diode (LED).

The connector holes 208 and 209 may include a first connector hole 208 that receives a connector (e.g., a USB connector) for transmitting and receiving power and/or data to and from an external electronic device and/or a second connector hole (e.g., an earphone jack) 209 that receives a connector for transmitting and receiving an audio signal to and from an external electronic device.

One problem that can occur is the intrusion of foreign material, such as water or dust, in the through hole 221.

Figure 4:
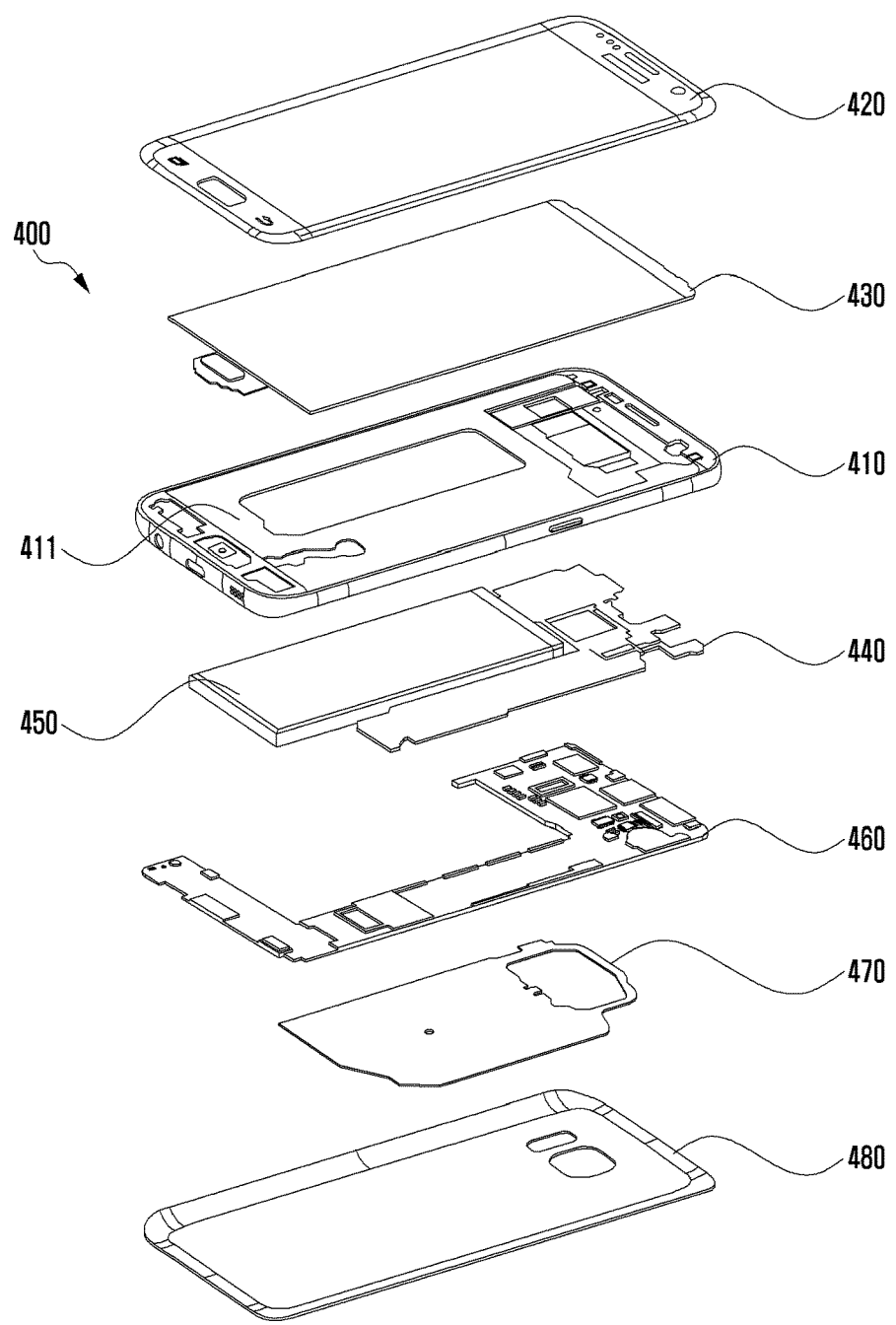
FIG. 4 is an exploded perspective view of the electronic device of FIG. 2.

FIG. 4 is an exploded perspective view of the electronic device of FIG. 2.

With reference to FIG. 4, an electronic device 400 (e.g., the electronic device 200 of FIG. 2) may include a side bezel structure 410, a first support member 411 (e.g., a bracket), a front plate 420, a display 430, a printed circuit board (PCB) 440, a battery 450, a second support member 460 (e.g., a rear case), an antenna 470, and a rear plate 480. In some embodiments, the electronic device 400 may omit at least one (e.g., the first support member 411 or the second support member 460) of the components or may further include other components. At least one of the components of the electronic device 400 may be the same as or similar to at least one of the components of the electronic device 200 of FIG. 2 or 3; therefore, a detailed description thereof may be omitted.

The first support member 411 may be disposed within the electronic device 400 to be connected to the side bezel structure 410 or may be formed integrally with the side bezel structure 410. The first support member 411 may be made of, for example, a metal material and/or a non-metal (e.g., polymer) material. The display 430 may be coupled to one surface of the first support member 411, and the PCB 440 may be coupled to the other surface thereof. In the PCB 440, a processor, memory, and/or interface may be mounted. The processor may include, for example, at least one of a central processing unit, application processor, graphic processing unit, image signal processor, sensor hub processor, and communications processor.

The memory may include, for example, a volatile memory or a non-volatile memory.

The interface may include, for example, a high definition multimedia interface (HDMI), a universal serial bus (USB) interface, a secure digital (SD) card interface, and/or an audio interface. The interface may, for example, electrically or physically connect the electronic device 400 to an external electronic device and include a USB connector, an SD card/multi-media card (MMC) connector, or an audio connector.

The battery 450 may supply power to at least one component of the electronic device 400 and include, for example, a non-rechargeable primary battery, a rechargeable secondary battery, or a fuel cell. At least a portion of the battery 450 may be disposed at, for example, substantially the same plane as that of the PCB 440. The battery 450 may be integrally disposed within the electronic device 200 and be disposed detachably at the electronic device 200.

The antenna 470 may be disposed between the rear plate 480 and the battery 450. The antenna 470 may include, for example, a near field communication (NFC) antenna, a wireless charging antenna, and/or a magnetic secure transmission (MST) antenna. The antenna 470 may perform, for example, NFC with an external device or may wirelessly transmit and receive power required for charging. In other embodiments, an antenna structure may be formed with a portion of the side bezel structure 410 and/or the first support member 411 or a combination thereof.

Figure 5:
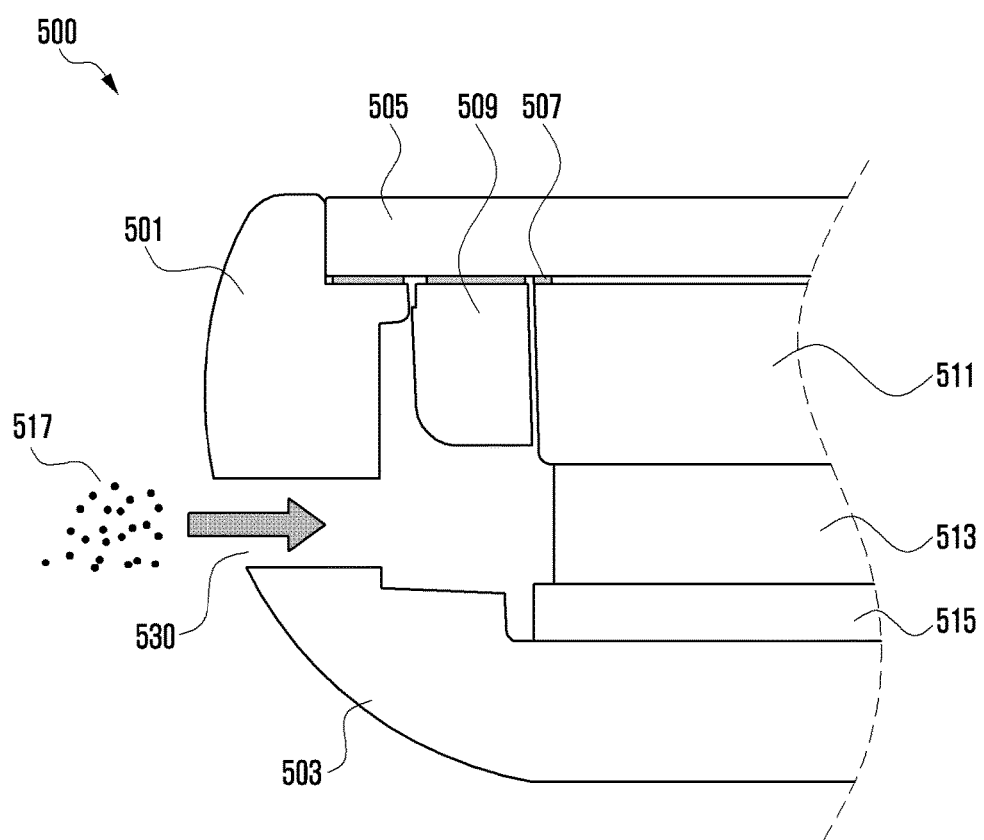
FIG. 5 is a cross-sectional view illustrating a process in which a foreign material enters through a through hole formed in the electronic device.

Referring now to FIG. 5 there is illustrated a cross-sectional view describing how a foreign material may enter through a through hole (e.g., through hole 221) formed in the electronic device.

With reference to FIG. 5, an electronic device 500 (e.g., the electronic device 200 of FIG. 2) according to an embodiment may include, for example, a housing (e.g., the housing 210 of FIG. 2) including a front plate 505 (e.g., the front plate 202 of FIG. 2), a rear plate 503 (e.g., the rear plate 211 of FIG. 3) disposed to face the front plate 505, and a side member 501 (e.g., the side bezel structure 218 of FIG. 2) enclosing a space between the front plate 505 and the rear plate 503.

According to an embodiment, at least one support member 509 may be disposed at a space between the front plate 505 and the rear plate 503. According to an embodiment, the support member 509 may be the same as or similar to the first support member 411 of FIG. 4. For example, a display 511 may be disposed at one surface (e.g., an upper surface of the support member) of the support member 509, and a PCB 515 may be disposed at the other surface (e.g., a lower surface of the support member) of the support member 509. According to an embodiment, the support member 509 may include a socket 513 that receives a tray (e.g., the tray 223 of FIG. 2). According to an embodiment, at least a portion of the support member 509 may be formed to enclose a side surface of the display 511.

According to an embodiment, at one surface of the display 511 (e.g., an upper surface of the display), a cover window 505 may be disposed as the front plate 505. The cover window 505 may be supported by the side member 501 and the support member 509. According to an embodiment, at a portion that supports the cover window 505 of the side member 501 and a portion that supports the cover window 505 of the support member 509, a buffer member 507 (e.g., a sponge) may be disposed.

According to an embodiment, at the side member 501, an opening portion (e.g., the opening portion 220 of FIG. 3) that inserts the tray 223 having a form to carry the subscriber identity module may be formed. A through hole 530 (e.g., the through hole 221 of FIG. 3) may be formed at a portion adjacent to the opening portion 220.

According to an embodiment, the through hole 530 may be a passage that inserts an external object (e.g., the detachment pin 228 of FIG. 3). For example, the external object 228, such as a pin or needle, may be inserted into an internal space of the electronic device 500 through the through hole 530 and have a length and width to press a tray detachment structure 513 for detaching the tray 223. When the tray detachment structure 513 is pressed by the external object 228, the tray 223 may be pushed in a direction opposite to the direction in which the external object 228 presses the tray detachment structure 513.

According to an embodiment, the tray detachment structure 513 may be disposed adjacent to the socket 513 that receives the tray 223 or may be formed integrally with the socket 513 that receives the tray 223. According to an embodiment, the tray detachment structure 513 may be disposed on a path into which the external object 228 is inserted through the through hole 530.

In certain embodiments, the tray detachment structure 513 can be a structure that extends from a point proximate to the through hole 530 to behind the end of the tray 223. When the structure is pressed in the direction from the through hole 530, the portion of the structure that is behind the tray 223 moves, presses, or applies force against the tray 223 in a direction opposite of the arrow in the figure.

While the external object 228 is not inserted, the through hole 530 is an open area that exposes an internal space of the electronic device 500. As a result, a foreign material 517 such as water or dust may enter into the electronic device 500 through the through hole 530. The foreign material 517 that enters into the electronic device 500 through the through hole 530 may become a cause of a failure or a malfunction of the electronic device 500. Alternatively, the foreign material 517 may enter between the display 511 and the front plate 505 resulting in an unpleasant appearance at the periphery of the display 511.

While the external object 228 is not inserted through the through holes 530, the electronic device 500 according to various embodiments of the present disclosure may include a flexible member (e.g., 605 of FIG. 6, 919 of FIG. 9) disposed within a space in order to block at least a portion of the through hole 530 and to be attached to the inside of the side member 501 at a periphery of the through hole 530.

Figure 6:
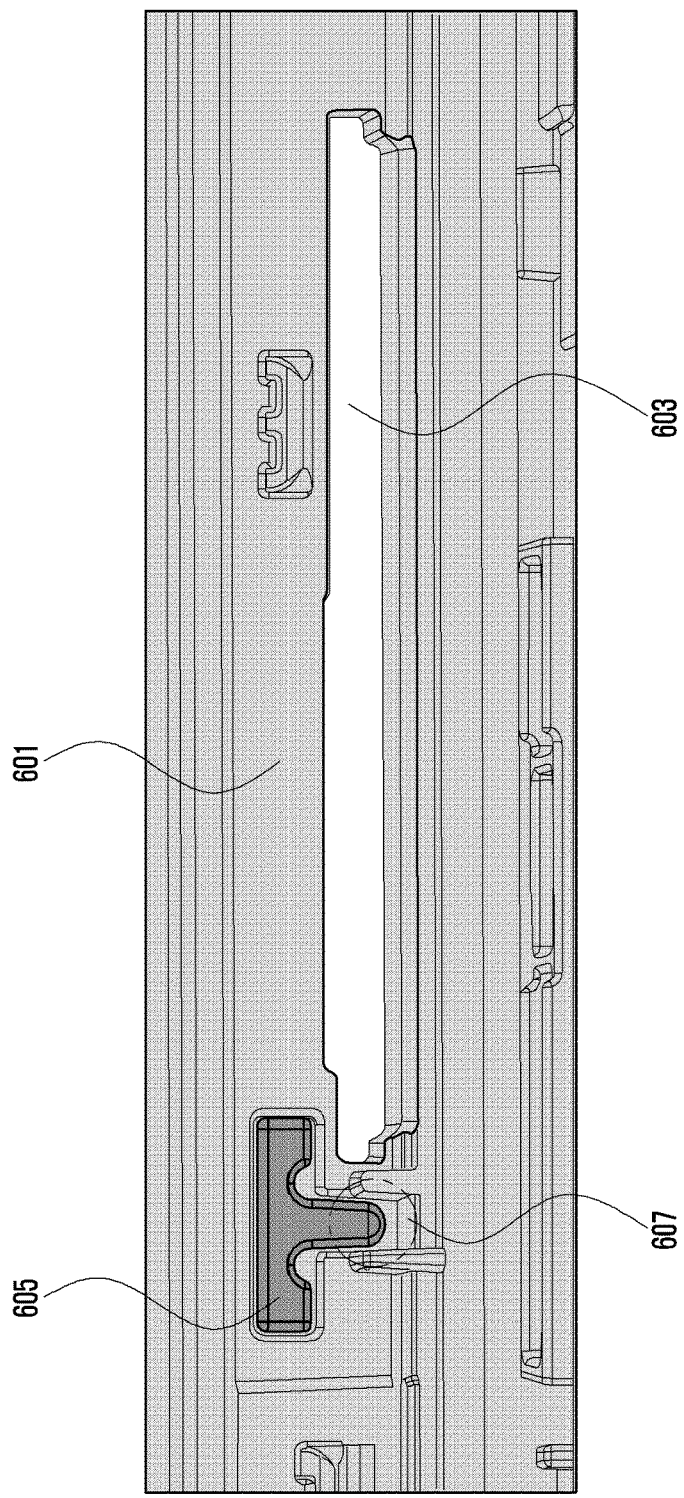
FIG. 6 is a diagram illustrating an opening portion into which a tray is inserted and a portion adjacent to the opening portion at an inner surface of a side member.
Figure 7:
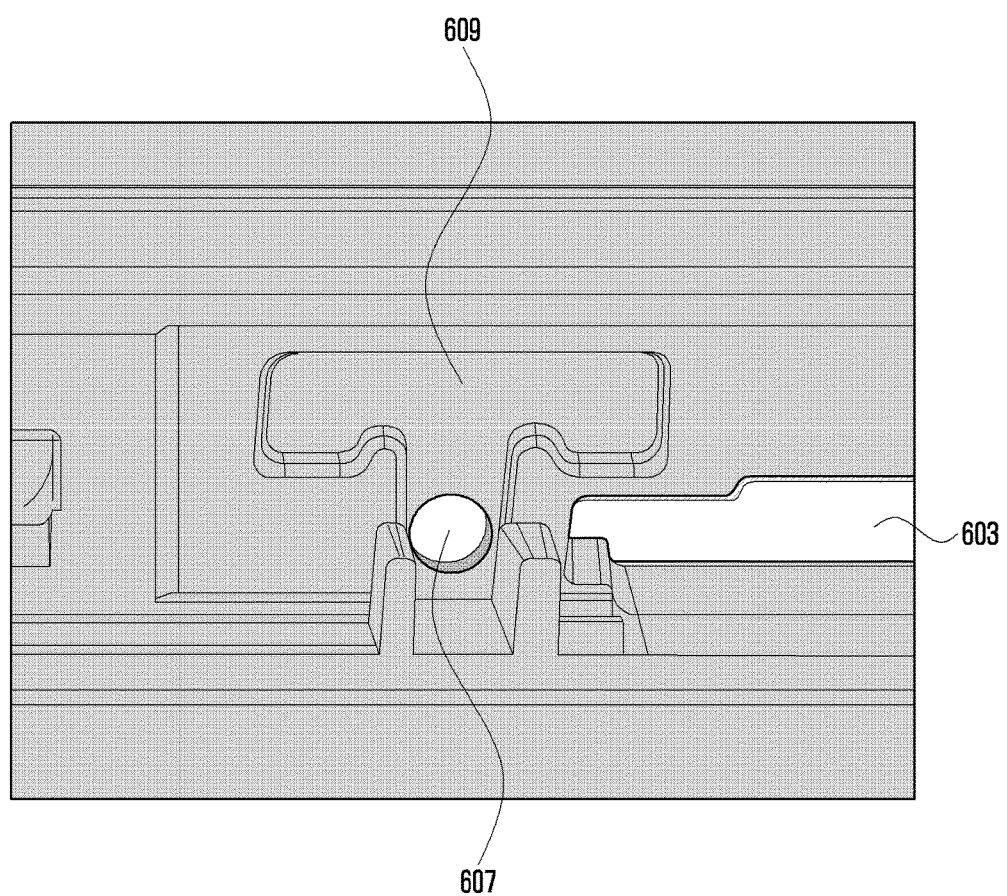
FIG. 7 is a diagram illustrating a receiving groove that receives a flexible member at an inner surface of a side member.
Figure 8:
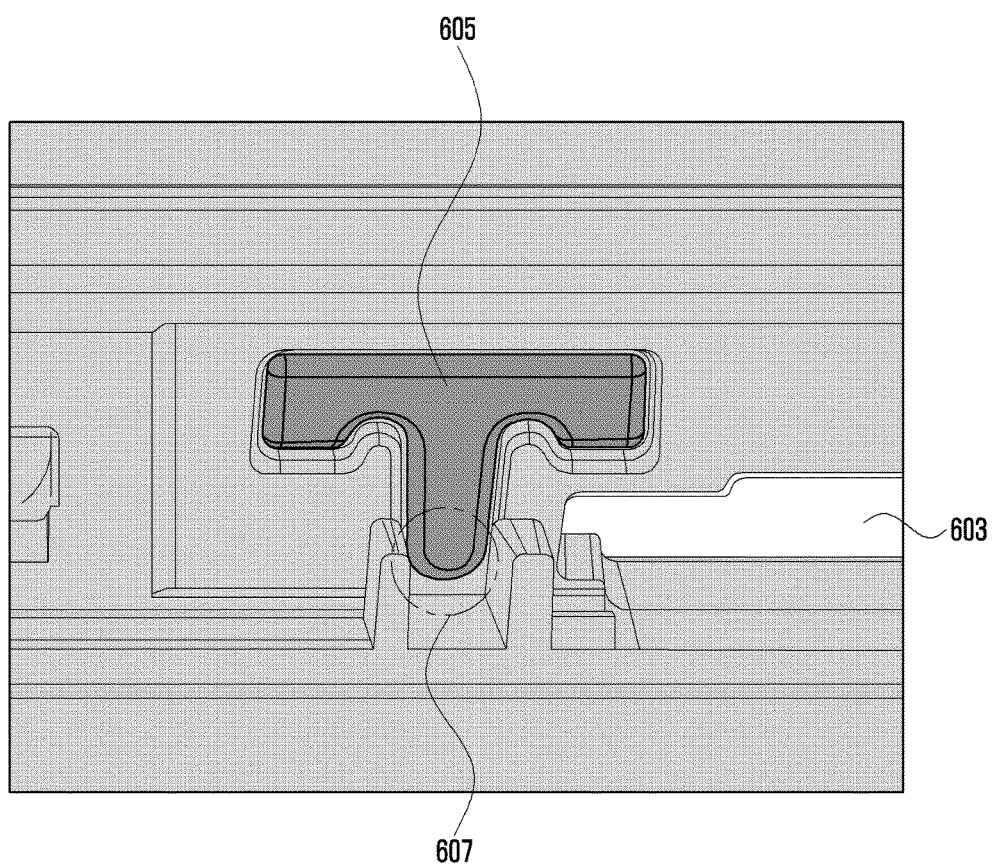
FIG. 8 is a diagram illustrating a disposition of a flexible member at an inner surface of a side member.
Figure 9:
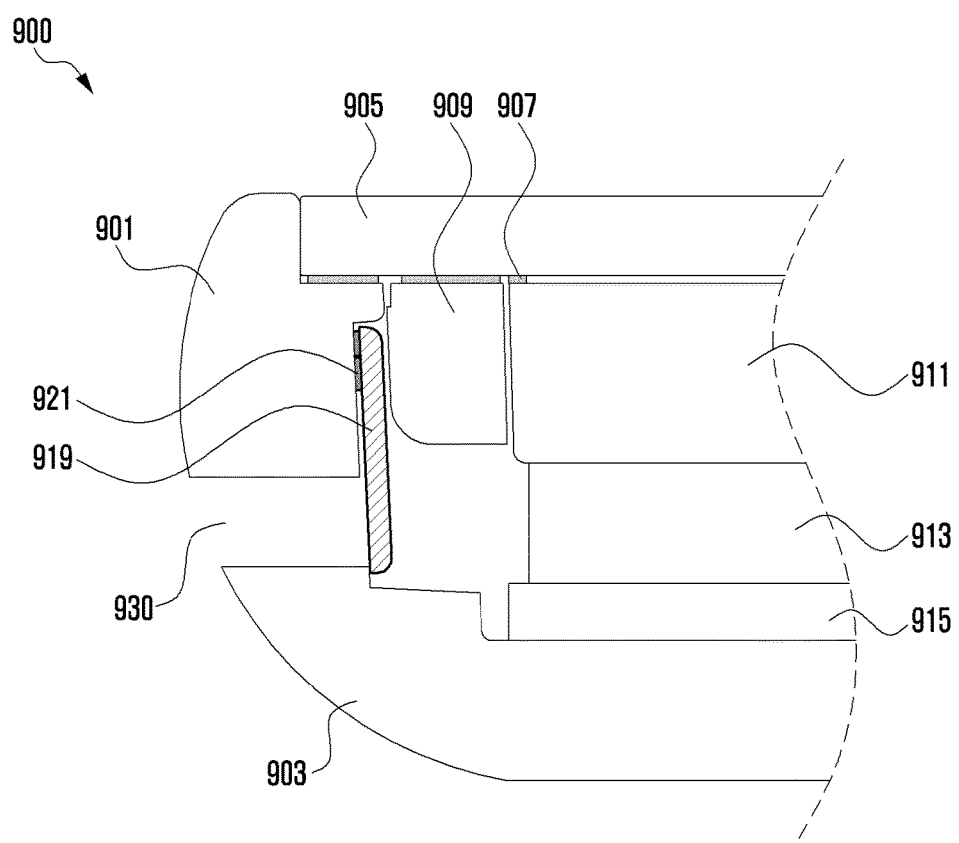
FIG. 9 is a cross-sectional view illustrating a portion of an electronic device according to an embodiment.
Figure 10A:
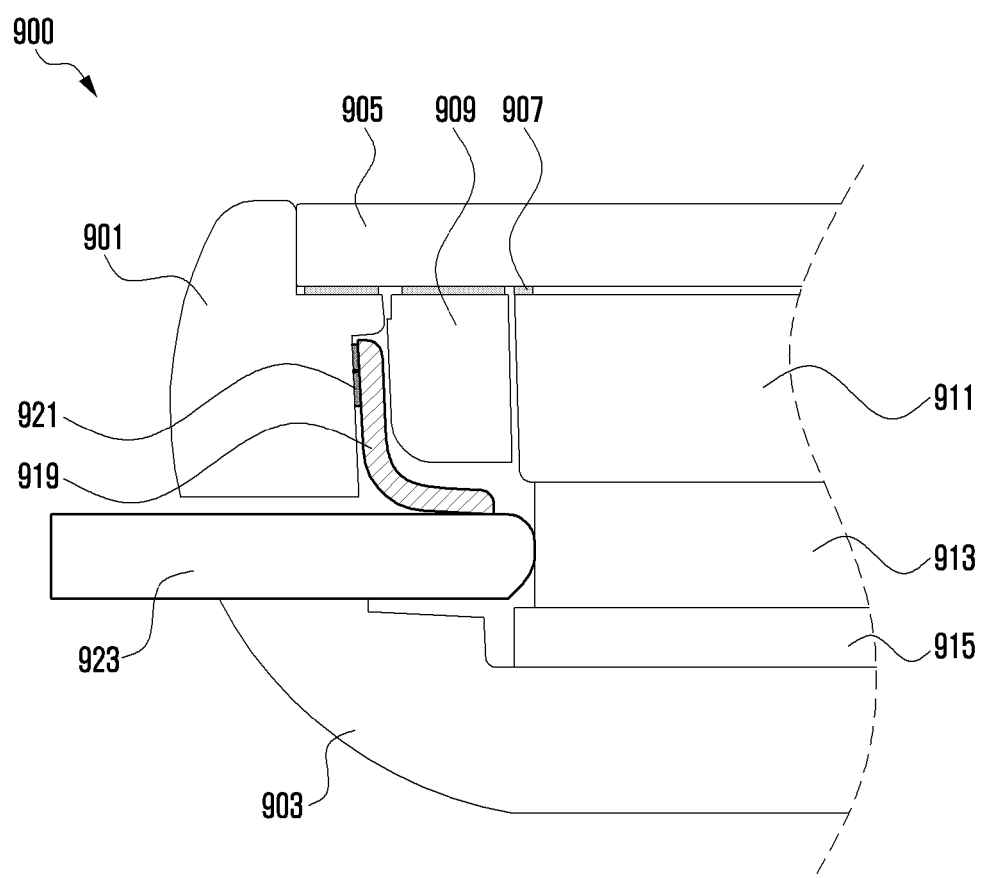
FIG. 10A and FIG. 10B are diagrams illustrating a structure in which a flexible member prevents a foreign material from entering.
Figure 10B:
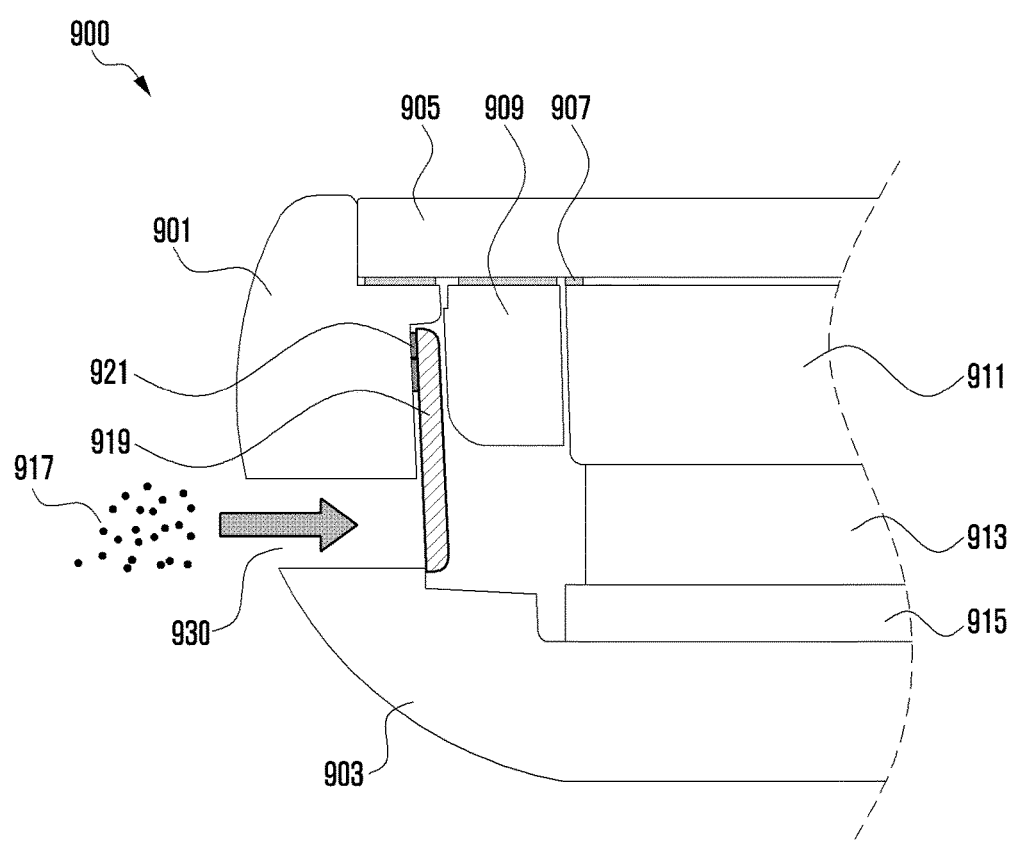

FIGS. 6-8 show the flexible member attached to the outside of the housing. FIGS. 9, 10A, and 10B show the flexible member attached to the inside of the housing.

FIG. 6 is a diagram illustrating an opening portion into which a tray is inserted and a portion adjacent to the opening portion at an inner surface of a side member. FIG. 7 is a diagram illustrating a receiving groove that receives a flexible member at an inner surface of a side member. FIG. 8 is a diagram illustrating a disposition of a flexible member received at a receiving groove.

With reference to FIGS. 6 to 8, an electronic device (e.g., the electronic device 200 of FIG. 2) according to an embodiment may include a side member 601 (e.g., the side bezel structure 218 of FIG. 2), an opening portion 603 (e.g., the opening portion 220 of FIG. 3), a through hole 607 (e.g., the through hole 221 of FIG. 3), and a flexible member 605.

According to an embodiment, the opening portion 603 may be a slot that receives a tray (e.g., the tray 223 of FIG. 3) in which a subscriber identification module (e.g., the SID card 226 of FIG. 3) is loaded.

According to an embodiment, the through hole 607 may be formed adjacent to the opening portion 603. The through hole 607 may be a hole for insertion of an external object (e.g., the detachment pin 228 of FIG. 3). The external object 228 may be inserted into an internal space of the electronic device 200 through, for example, the through hole 607 and detach the tray 223 by pressing the tray detachment structure (e.g., the tray detachment structure 513 of FIG. 5).

According to an embodiment, the flexible member 605 may be attached to the inside of the side member 601 and block at least a portion of the through hole 607. According to an embodiment, the flexible member 605 may be made of an elastic material and be bent. For example, when the external object 228 is inserted through the through hole 607, the flexible member 605 may be bent so that the external object 228 may press the tray detachment structure 513. For example, while the external object 228 is not inserted into the through hole 607, the flexible member 605 may block at least a portion of the through hole 607.

According to an embodiment, the side member 601 may include a receiving groove 609 that receives the flexible member 605. For example, the receiving groove 609 may be the same shape as or a shape similar to that of the flexible member 605. As another example, an area of the receiving groove 609 may be equal to or larger than that of the flexible member 605. According to an embodiment, the through hole 607 may be disposed in at least a portion of the receiving groove 609.

FIG. 9 is a cross-sectional view illustrating a portion of an electronic device according to an embodiment. FIGS. 10A and 10B are diagrams illustrating a structure in which a flexible member prevents a foreign material from entering.

With reference to FIGS. 9 and 10A and 10B, an electronic device 900 (e.g., the electronic device 200 of FIG. 2) according to an embodiment may include, for example, a housing (e.g., the housing 210 of FIG. 2) including a front plate 905 (e.g., the front plate of FIG. 2), a rear plate 903 (e.g., the rear plate 211 of FIG. 3) disposed to face the front plate 905, and a side member 901 (e.g., the side bezel structure 218) enclosing a space between the front plate 905 and the rear plate 903.

According to an embodiment, at least one support member 909 may be disposed at a space between the front plate 905 and the rear plate 903. According to an embodiment, the support member 909 may be the same as or similar to the first support member 411 of FIG. 4. For example, a display 911 may be disposed at one surface (e.g., an upper surface of a support member) of the support member 909, and a PCB 915 may be disposed at the other surface of the support member 909 (e.g., a lower surface of the support member 909). According to an embodiment, the support member 909 may include a socket 913 that receives a tray (e.g., the tray 223 of FIG. 3). According to an embodiment, at least a portion of the support member 909 may be formed to enclose a side surface of the display 911.

According to an embodiment, at one surface of the display 911 (e.g., an upper surface of the display), a cover window 905 may be disposed as the front plate 905. The cover window 905 may be supported by the side member 901 and the support member 909. According to an embodiment, at a portion that supports the cover window 905 of the side member 901 and a portion that supports the cover window 905 of the support member 909, a buffer member 907 (e.g., sponge) may be disposed.

According to an embodiment, in the side member 901, an opening portion (e.g., the opening portion 220 of FIG. 3) for insertion of the tray 223 having a form to carry a subscriber identity module may be formed. A through hole 930 (e.g., the through hole 221 of FIG. 3) may be disposed at a portion adjacent to the opening portion 220.

According to an embodiment, the through hole 930 may be a hole for insertion of an external object 923 (e.g., the detachment pin 228 of FIG. 3). For example, the external object 923 may be inserted into an internal space of the electronic device 900 through the through hole 930 and have a length and width to press the tray detachment structure 913 for detaching the tray 223. According to an embodiment, the tray detachment structure 913 may be disposed adjacent to the socket 913 that receives the tray 223 or may be integrally formed with the socket 913. According to an embodiment, the tray detachment structure 913 may be disposed on a path into which the external object 923 is inserted through the through hole 930.

According to an embodiment, while the external object 923 is not inserted through the through hole 930, the side member 901 may include a flexible member 919 disposed within the space in order to block at least a portion of the through hole 930 to be attached to the inside of the side member 901 at a periphery of the through hole 930.

According to an embodiment, at least a portion (hereinafter, a fixed portion) of the flexible member 919 may be attached to an inner surface of the side member 901 by an adhesive 921. At least another portion (hereinafter, a moving portion) of the flexible member 919 may be disposed to block the through hole 930. According to an embodiment, the fixed portion of the flexible member 919 may be attached and fixed to an inner surface of the side member 901 regardless of whether the external object 923 is inserted into the through hole 930. According to an embodiment, while the external object 923 is not inserted through the through hole 930, the moving portion of the flexible member 919 may block the through hole 930, and when the external object 923 is inserted into the through hole 930, the moving portion of the flexible member 919 may be bent such that the external object 923 may press the tray detachment structure 913. According to an embodiment, while the external object 923 is not inserted through the through hole 930, the moving portion of the flexible member 919 may block the through hole 930 to prevent a foreign material from entering into the electronic device 900.

Figure 11:
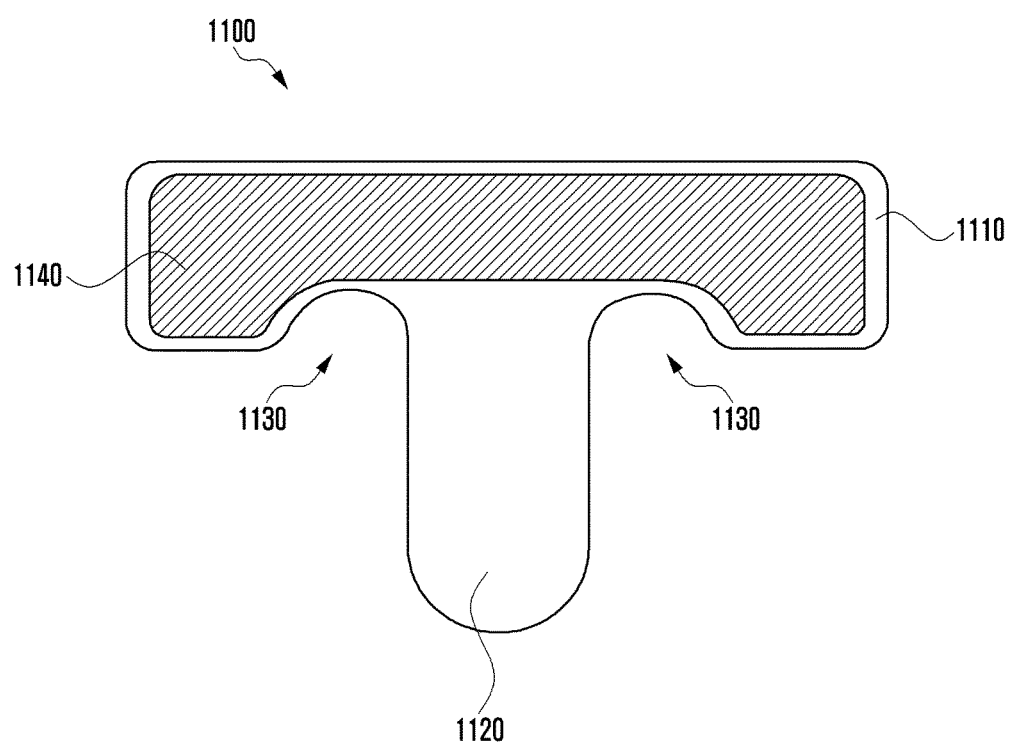
FIG. 11 is a plan view illustrating a flexible member according to an embodiment.

FIG. 11 is a plan view illustrating a flexible member according to an embodiment.

With reference to FIG. 11, a flexible member 1100 (e.g., 919 of FIG. 9) according to an embodiment may include a fixed portion 1110 attached and fixed to a side member (e.g., 901 of FIG. 9) and a moving portion 1120 bent or unbent according to whether an external object (e.g., 923 of FIG. 10A) is inserted into a through hole (e.g., 930 of FIG. 9).

According to an embodiment, the fixed portion 1110 of the flexible member 1100 may be attached to an inner surface of the side member 901 regardless of whether the external object 923 is inserted into the through hole (e.g., 930). For example, the fixed portion 1110 of the flexible member 1100 may be attached to a side member (e.g., the side member 218 of FIG. 2) using an adhesive 1140.

According to an embodiment, the moving portion 1120 of the flexible member 1100 may block the through hole 930 while the external object 923 is not inserted through the through hole 930 and may be bent such that the external object 923 may press a tray detachment structure when the external object 923 is inserted through the through hole 930.

According to an embodiment, the flexible member 1100 may have a shape similar to a letter "⊤". For example, the fixed portion 1110 of the flexible member 1100 may be formed in a transverse direction and attached to the side member. For example, the moving portion 1120 of the flexible member 1100 may be formed in a direction vertical to a central portion of the fixed portion 1110. According to an embodiment, at least a portion of the moving portion 1120, for example, an end portion of the moving portion 1120, may be disposed to correspond to the through hole 930 to block at least a portion of the through hole 930. According to another embodiment, the flexible member 1100 may have various shapes in addition to the letter "T". For example, the flexible member 1100 may have a shape such as "⊓" or "Γ" or may have a shape such as "—" or "|" similar to a bar or a column.

According to an embodiment, the fixed portion 1110 of the flexible member 1100 may include a concave portion 1130. According to an embodiment, the concave portion 1130 may be formed to correspond to each of both sides of the moving portion 1120. According to an embodiment, in the flexible member 1100, as a concave portion 1130 is formed in each of both sides of the moving portion 1120, a length of the moving portion 1120 may be extended. For example, the concave portion 1130 may perform a function of relatively increasing a length of the moving portion 1120 within a limited area of the flexible member 1100. According to various embodiments, a shape of the concave portion 1130 may have various shapes such as a circle, an oval, or a polygon.

Figure 12:
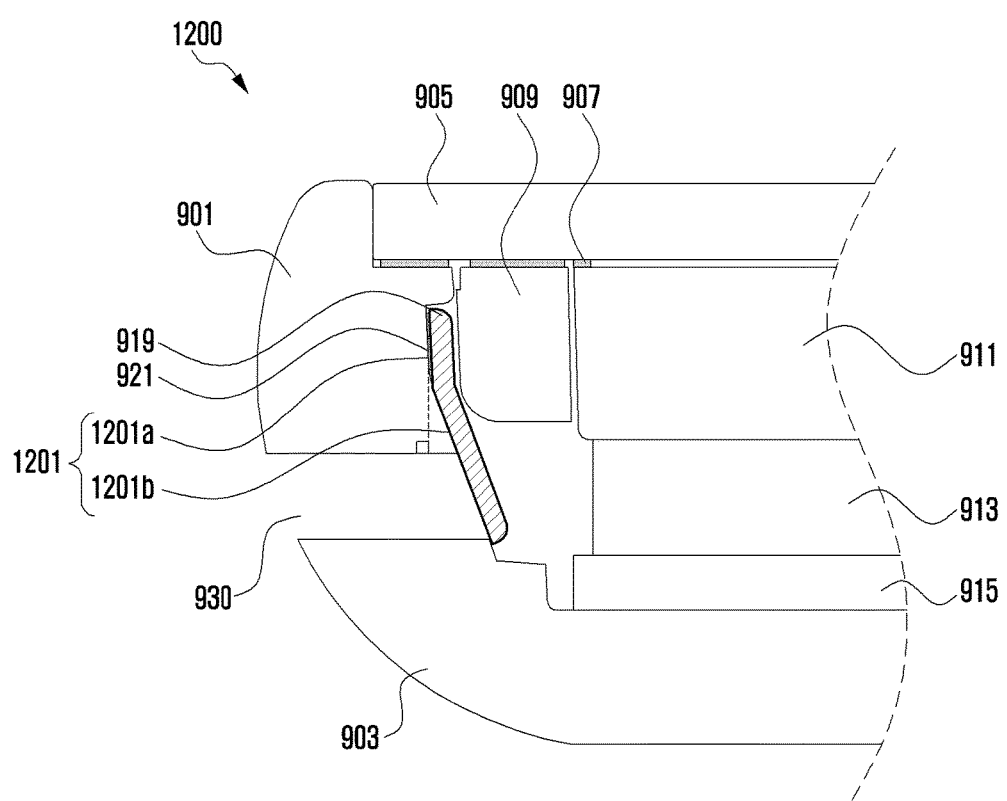
FIG. 12 is a cross-sectional view illustrating a portion of an electronic device according to another embodiment.
Figure 13:
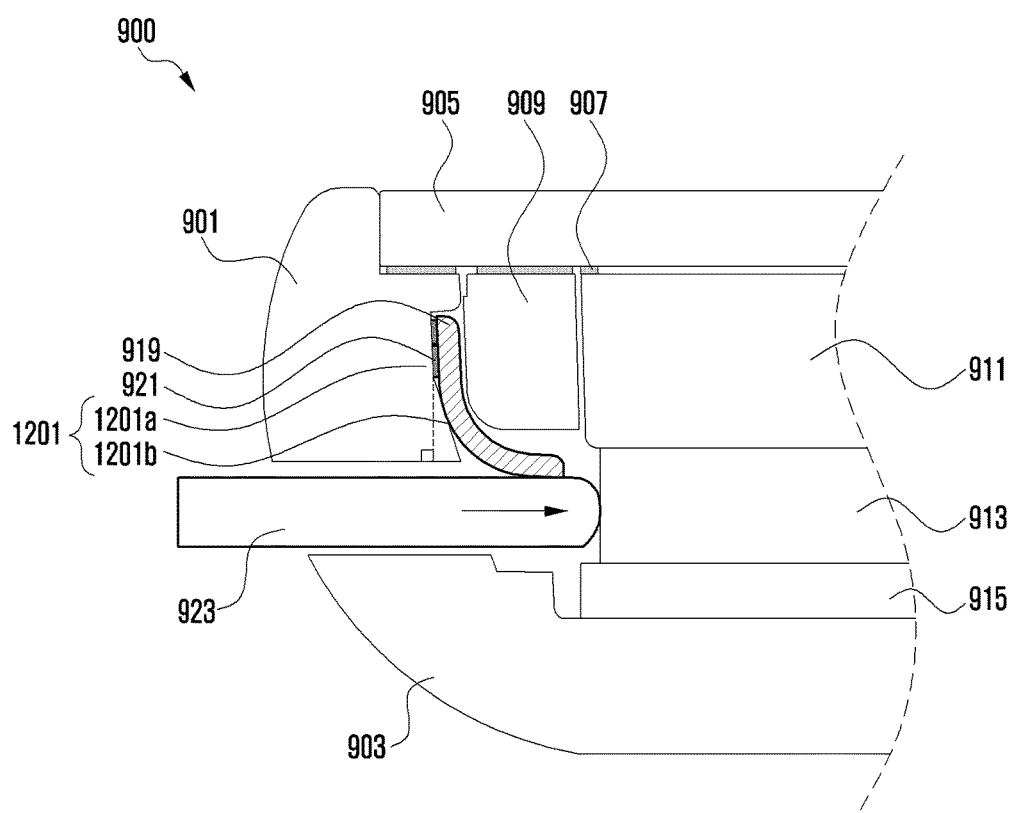
FIG. 13 is a diagram illustrating a structure in which a flexible member of an electronic device prevents a foreign material from entering according to another embodiment.

FIG. 12 is a cross-sectional view illustrating a portion of an electronic device according to another embodiment. FIG. 13 is a diagram illustrating a structure in which a flexible member of an electronic device prevents a foreign material from entering according to another embodiment.

An electronic device 1200 according to another embodiment shown in FIGS. 12 and 13 may be the same as or similar to the electronic device 900 shown in FIG. 9. In FIGS. 12 and 13, the same constituent elements as or constituent elements similar to those of the electronic device shown in FIG. 9 are denoted by the same reference numerals as those of FIG. 9 and a description of the same reference numerals is replaced with that of FIG. 9 and only dissimilar constituent elements will be described here in detail.

With reference to FIGS. 12 and 13, an electronic device 1200 (e.g., 200 of FIG. 2) according to another embodiment of the present disclosure may include a vertical surface 1201a and an inclined surface 1201b, which are inner surfaces of a side member 901.

According to an embodiment, the vertical surface 1201a may be disposed at the upper side relative to the inclined surface 1201b. For example, the vertical surface 1201a may be disposed relatively close to a front plate 905, and the inclined surface 1201b may be disposed relatively close to the through hole 930.

According to an embodiment, a fixed portion (e.g., 1110 of FIG. 11) of a flexible member 919 may be disposed to correspond to the vertical surface 1201a to be attached to the vertical surface 1201a.

According to an embodiment, the flexible member 919 may be bent by an angle formed by the vertical surface 1201a and the inclined surface 1201b at a boundary portion of the vertical surface 1201a and the inclined surface 1201b. For example, at least a portion (e.g., the moving portion 1120 of FIG. 11) of the flexible member 919 may block a through hole with being inclined by an angle of the inclined surface 1201b while the external object 923 is not inserted through the through hole 930. For example, a first portion of the flexible member 919 may be disposed to correspond to the vertical surface 1201a, a second portion connected to the first portion may be disposed to correspond to the inclined surface 1201b, and a third portion formed in a downward direction from the second portion may be disposed to correspond to the through hole 930.

According to an embodiment, the moving portion 1120 of the flexible member 919 may block the through hole 930 with being inclined by an angle of the inclined surface 1201b while the external object 923 is not inserted through the through hole 930 and may be bent such that the external object 923 may press the tray detachment structure 913 when the external object 923 is inserted through the through hole 930.

As the flexible member 919 has a specific inclination by the inclined surface 1201a of the side member 901, when the external object 923 is inserted, the electronic device 1200 according to various embodiments of the present disclosure may be relatively bent at a lower degree angle. For example, the flexible member 919 may be relatively less stressed by bending, and a life-span thereof may be improved. In the electronic device 1200 according to various embodiments of the present disclosure, the side member 901 includes a vertical surface 1201a and an inclined surface 1201b; thus, a close contact force of the flexible member 919 to the side member can increase or, when the inserted external object 923 is released, a restoring force can increase in which the bent flexible member 919 is restored to again block the through hole.

Figure 14:
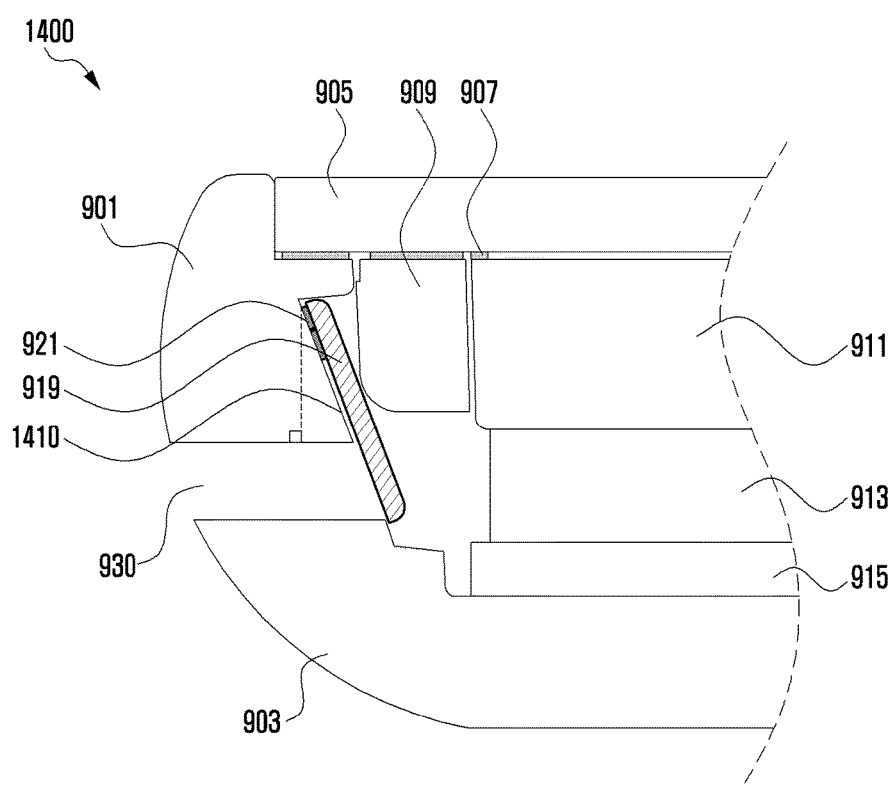
FIG. 14 is a cross-sectional view illustrating a portion of an electronic device according to another embodiment.
Figure 15:
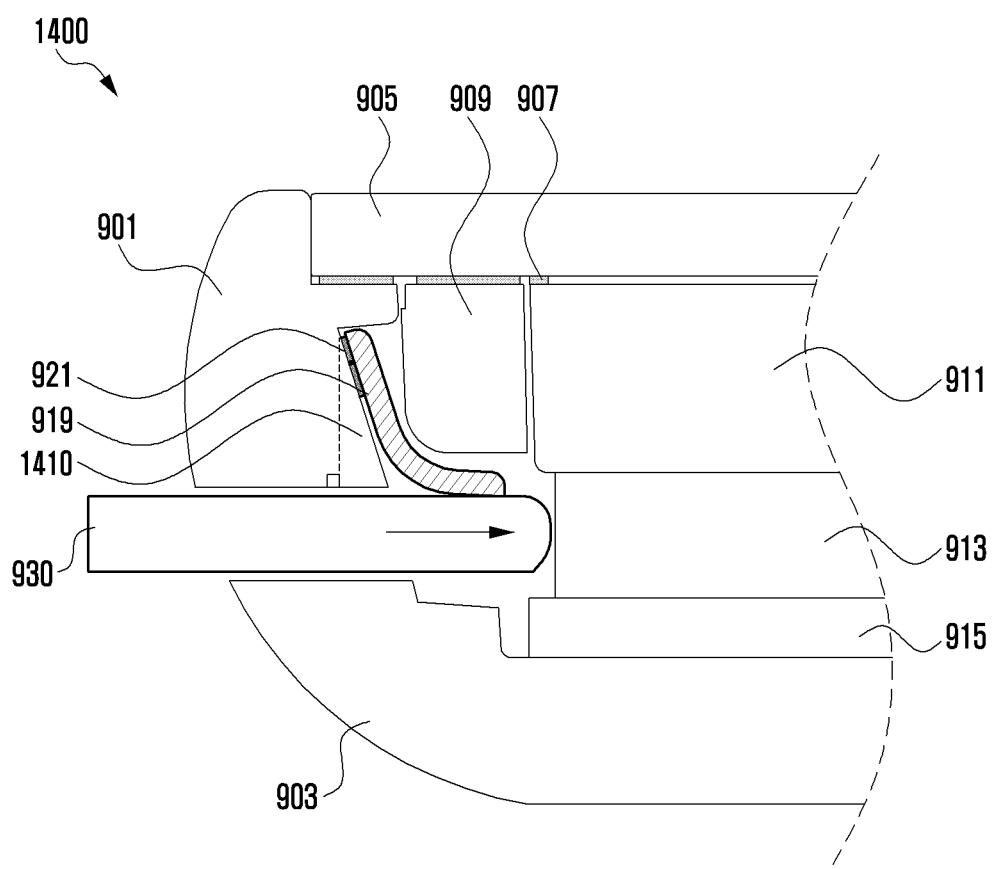
FIG. 15 is a diagram illustrating a structure in which a flexible member of an electronic device prevents a foreign material from entering according to another embodiment.

FIG. 14 is a cross-sectional view illustrating a portion of an electronic device according to another embodiment. FIG. 15 is a diagram illustrating a structure in which a flexible member of an electronic device prevents a foreign material from entering according to another embodiment.

An electronic device 1400 according to another embodiment shown in FIGS. 14 and 15 may be the same as or similar to the electronic device 900 shown in FIG. 9. In FIGS. 14 and 15, the same constituent elements as or constituent elements similar to those of the electronic device shown in FIG. 9 are denoted by the same reference numerals as those of FIG. 9 and a description of the same reference numerals is replaced with that of FIG. 9 and only dissimilar constituent elements will be described here in detail.

With reference to FIGS. 14 and 15, an electronic device 1400 (e.g., 200 of FIG. 2) according to another embodiment of the present disclosure may include an inclined surface 1410, which is an inner surface of a side member 901.

According to an embodiment, the inner surface of the side member 901 may include an inclined surface 1410 at a portion corresponding to a through hole 930. According to an embodiment, the inclined surface 1410 may have a shape inclined by a designated angle. According to an embodiment, the flexible member 919 may be disposed to correspond to the inclined surface 1410 to be attached to the inclined surface 1410. For example, a fixed portion (e.g., 1110 of FIG. 11) of the flexible member 919 may be attached to the inclined surface 1410 by an adhesive 921, and a moving portion (e.g., 1120 of FIG. 11) of the flexible member 919 may include a first portion disposed to correspond to the inclined surface 1410 and a second portion connected to the first portion and that blocks the through hole 930.

According to an embodiment, the moving portion 1120 of the flexible member 919 may block the through hole 930 with being inclined by an angle of the inclined surface 1410 while the external object 923 is not inserted through the through hole 930 and may be bent such that the external object 923 may press the tray detachment structure 913 when the external object 923 is inserted through the through hole 930.

As the flexible member 919 has a specific inclination by the inclined surface 1410 of the side member 901, when the external object 923 is inserted, the electronic device 1400 according to various embodiments of the present disclosure may be relatively less bent. For example, the flexible member 919 may be relatively less stressed by bending, and a life-span thereof may be improved.

Figure 16:
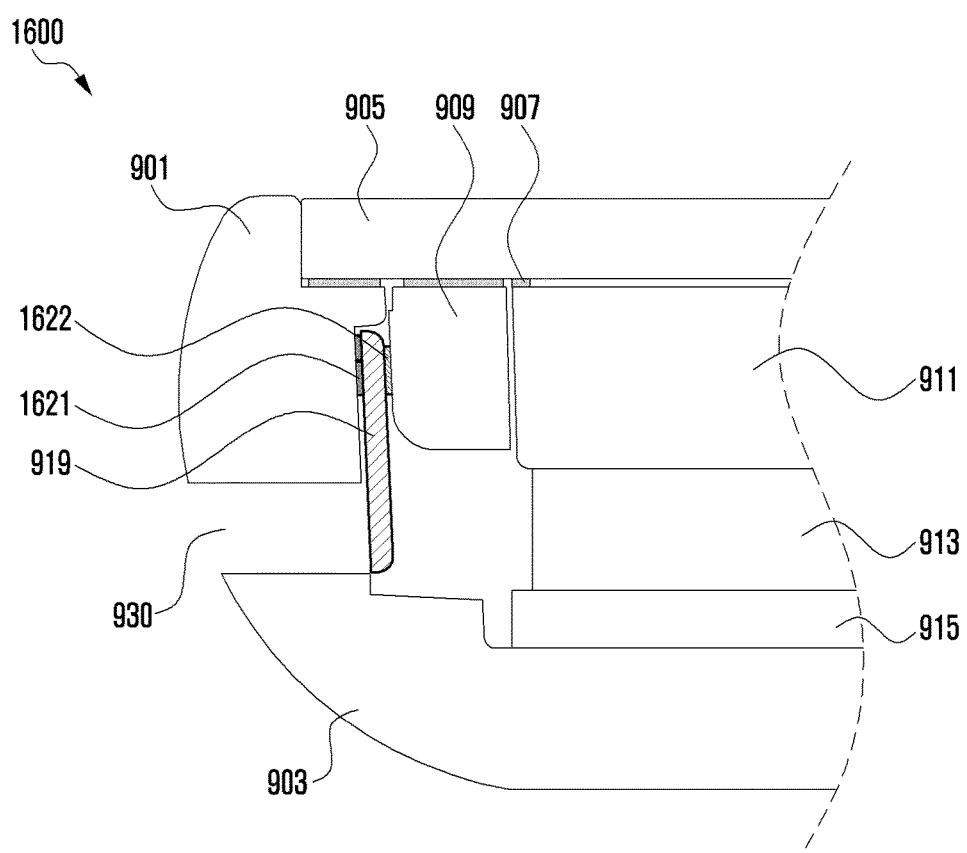
FIG. 16 is a cross-sectional view illustrating a portion of an electronic device according to another embodiment.
Figure 17:
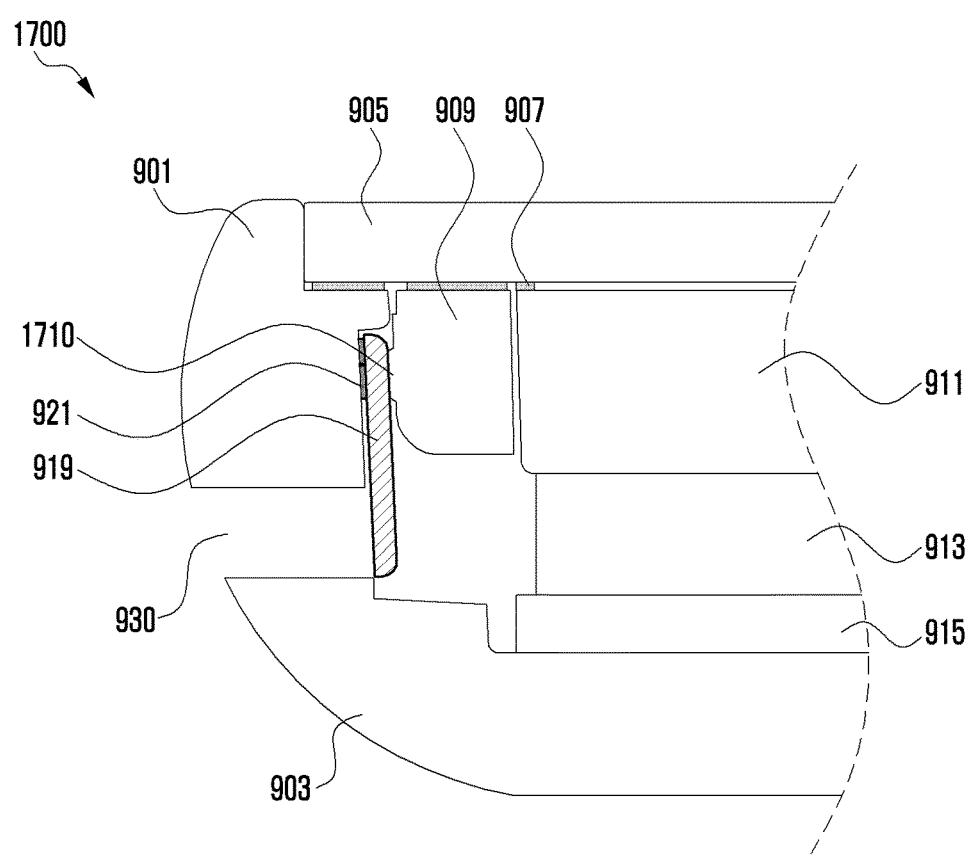
FIG. 17 is a cross-sectional view illustrating a portion of an electronic device according to another embodiment.

FIG. 16 is a cross-sectional view illustrating a portion of an electronic device according to another embodiment. FIG. 17 is a cross-sectional view illustrating a portion of an electronic device according to another embodiment.

An electronic device 1600 according to another embodiment shown in FIGS. 16 and 17 may be the same as or similar to the electronic device 900 shown in FIG. 9. In FIGS. 16 and 17, the same constituent elements as or constituent elements similar to those of the electronic device shown in FIG. 9 are denoted by the same reference numerals as those of FIG. 9 and a description of the same reference numerals is replaced with that of FIG. 9 and only dissimilar constituent elements will be described here in detail.

With reference to FIG. 16, an electronic device 1600 (e.g., 200 of FIG. 2) according to another embodiment of the present disclosure may include an adhesive 1622 disposed between a support member 909 and a flexible member 919 to fix the flexible member 919. For example, the electronic device 1600 may include a first adhesive 1621 that fixes one surface of the flexible member 919 at the inner surface of the side member 901 and a second adhesive 1622 that fixes the other surface of the flexible member 919 between the support member 909 and the flexible member 919.

With reference to FIG. 17, a support member 909 of an electronic device 1700 (e.g., 200 of FIG. 2) according to another embodiment of the present disclosure may include a protruding portion 1710 protruded in a direction of a flexible member 919. According to an embodiment, the protruding portion 1710 of the support member 909 may fix the flexible member 919 by pressing a portion of the flexible member 919.

Figure 18:
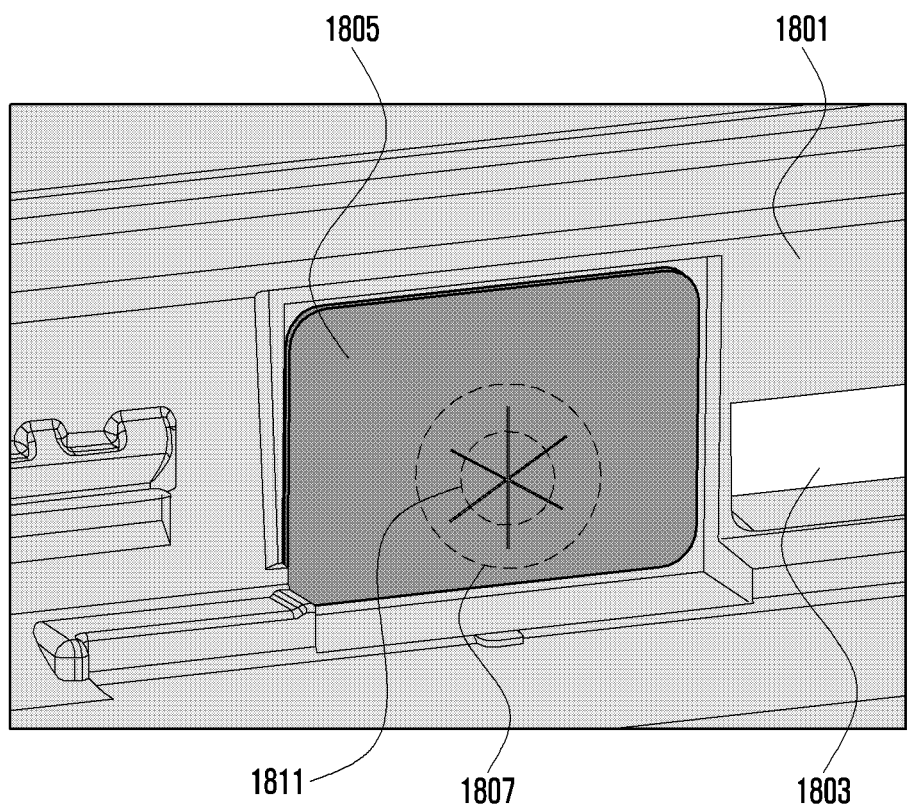
FIG. 18 is a diagram illustrating a structure of a flexible member according to another embodiment.
Figure 19:
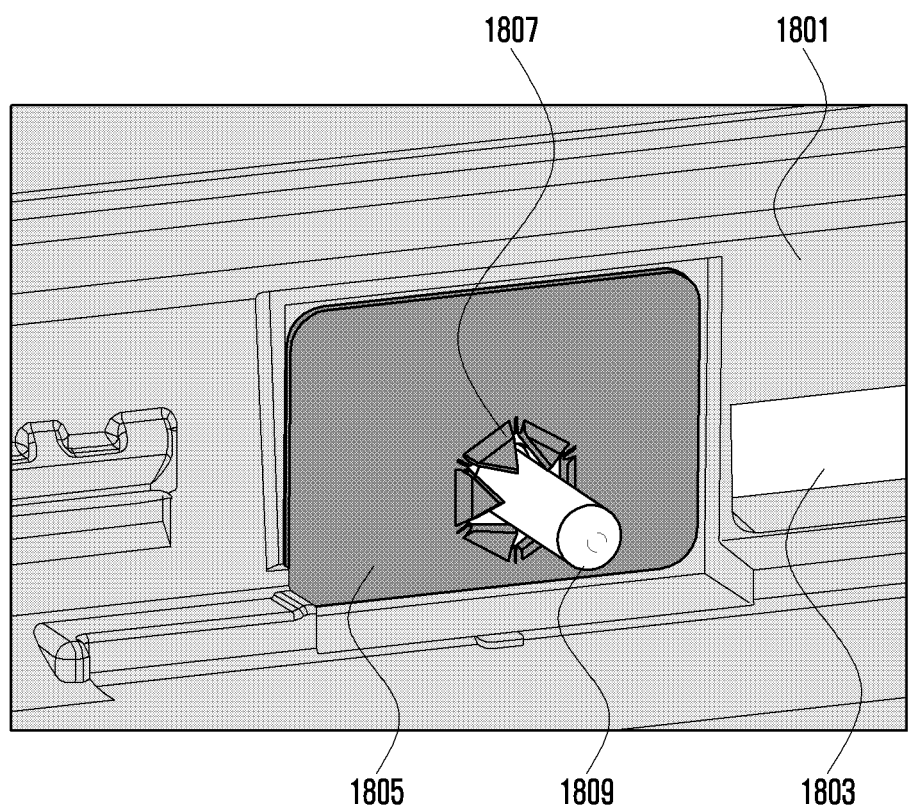
FIG. 19 is a diagram illustrating a structure in which a flexible member prevents a foreign material from entering according to another embodiment.

FIG. 18 is a diagram illustrating a structure of a flexible member according to another embodiment of the present disclosure. FIG. 19 is a diagram illustrating a structure in which a flexible member prevents a foreign material from entering according to another embodiment of the present disclosure.

With reference to FIGS. 18 and 19, according to various embodiments of the present disclosure, a flexible member 1805 may have a designated shape. According to an embodiment, the designated shape may include a shape of an oval or a polygon. For example, the flexible member 1805 may have a rectangular shape. According to an embodiment, the flexible member 1805 may be disposed at a through hole 1811 (e.g., 221) disposed adjacent to an opening portion 1803 (e.g., 220) of a side member 1801 and within the side member 1801 in order to cover a periphery of the through hole 1811. According to an embodiment, the flexible member 1805 may include a plurality of cut portions 1807 cut in a plurality of directions about the through hole 1811. At least some of the plurality of cut portions 1807 may be bent in a direction of the tray detachment structure (e.g., 913) such that the outer object (e.g., 923 of FIG. 10A) presses the tray detachment structure (e.g., 913), for example, while the outer object 923 is inserted into the through hole 1811. According to an embodiment, an entire area of the plurality of cut portions 1807 may be larger than an area of the through hole 1811. According to another embodiment, a shape of the plurality of cut portions 1807 may be variously changed. For example, when an inner space of the electronic device (e.g., 200 of FIG. 2) may be secured, the plurality of cut portions 1807 may have various cut forms by a process of attaching a tape of two or more surfaces.

An electronic device (e.g., the electronic device 900 of FIG. 9) according to various embodiments of the present disclosure may include a housing including a front plate (e.g., 905 of FIG. 9), a rear plate (e.g., 903 of FIG. 9) facing in a direction opposite to that of the front plate 905, and a side member (e.g., 901 of FIG. 9) enclosing a space between the front plate 905 and the rear plate 903, wherein the side member 901 includes an opening portion 220 (e.g., 220 of FIG. 3) and a through hole (e.g., 930 of FIG. 9) adjacent to the opening portion 220, a touch screen display (e.g., 911 of FIG. 9) disposed between the front plate 905 and the rear plate 903, a tray (e.g., 223 of FIG. 3) configured to be inserted into the space through the opening portion 220 and having a form to carry a subscriber identification module (SIM), a socket disposed within the space and configured to receive the tray through the opening portion 220, a tray detachment structure (e.g., 913 of FIG. 9) disposed adjacent to the socket within the space and configured to detach the tray when pressed by an external object (e.g., 923 of FIG. 10A) inserted through the through hole 930, and a flexible member 919 including a portion that blocks at least a portion of the through hole 930 while the external object 923 is not inserted through the through hole 930, disposed within the space, and attached to the side member 901 at a periphery of the through hole 930. The portion of the flexible member 919 may be bent toward the tray detachment structure 913 so that the external object 923 may contact with the tray detachment structure 913. The flexible member 919 may include a fixed portion (e.g., 1110 of FIG. 11) attached and fixed to the side member 901 at a periphery of the through hole 930 and a moving portion (e.g., 1120 of FIG. 11) formed in a direction vertical to the fixed portion 1110 to block at least a portion of the through hole 930. The moving portion 1120 may be connected to a central portion of the fixed portion 1110, and the fixed portion 1110 may include a concave portion (e.g., 1130 of FIG. 11) positioned to correspond to each of both sides of the moving portion 1120. The side member 901 at a periphery of the through hole 930 may include a receiving groove that receives the flexible member 919. An inner surface of the side member 901 to which the flexible member 919 is attached may include an inclined surface (e.g., 1201b of FIG. 12). In the flexible member 919, a portion that blocks at least a portion of the through hole 930 may cover the through hole 930 with being inclined by an angle of the inclined surface. An inner surface of the side member 901 to which the flexible member 919 is attached may include a vertical surface to which the fixed portion 1110 is attached and an inclined surface inclined by a specific angle from the vertical surface and disposed to face at least a portion of the moving portion 1120. At least a portion of the moving portion 1120 may be bent at a boundary portion of the vertical surface and the inclined surface, and at least the remaining portions of the moving portion 1120 may cover the through hole 930 with being inclined by an angle of the inclined surface. The electronic device may further include a bracket disposed within the space and that supports the touch screen display 911, and the bracket may include a protruding portion protruded in a direction of the side member 901 at a periphery of the protruding portion 930 in order to fix the flexible member 919 by pressing the flexible member 919. The electronic device may further include a first adhesive disposed between the flexible member 919 and the side member 901 at a periphery of the through hole 930 and a second adhesive disposed between the protruding portion of the bracket and the flexible member 919. The flexible member 919 may include a plurality of cut portions cut in a plurality of directions about the through hole 930. The plurality of cut portions may block at least a portion of the through hole 930 while the external object 923 is not inserted through the through hole 930 and may be bent in a direction of the tray detachment structure 913 such that the external object 923 may contact with the through hole 930 while the external object 923 is inserted through the through hole 930. An entire area of the plurality of cut portions may be larger than an area of the through hole 930. The flexible member 919 may be made of one of rubber, polyethylene terephthalate (PET), and polycarbonate (PC).

An electronic device (e.g., the electronic device 900 of FIG. 9) according to various embodiments of the present disclosure may include a housing including a front plate (e.g., 905 of FIG. 9), a rear plate (e.g., 903 of FIG. 9) facing a direction opposite to that of the front plate 905, and a side member (e.g., 901 of FIG. 9) enclosing a space between the front plate 905 and the rear plate 903, wherein the side member 901 may include a through hole (e.g., 930 of FIG. 9) into which an outer object (e.g., 923 of FIG. 10A) may be inserted; and a flexible member (e.g., 919 of FIG. 9) attached to the inner surface of the side member 901 and that blocks at least a portion of the through hole 930 while the external object 923 is not inserted through the hole 930. The flexible member 919 may be bent so that the external object 923 is inserted into the space while the external object 923 is inserted through the through hole 930. The flexible member 919 may include a fixed portion (e.g., 1110 of FIG. 11) attached and fixed to the side member 901 at a periphery of the through hole 930 and a moving portion (e.g., 1120 of FIG. 11) formed in a direction vertical to the fixed portion 1110 to block at least a portion of the through hole 930. The moving portion 1120 may be connected to a central portion of the fixed portion 1110, and the fixed portion 1110 may include a concave portion (e.g., 1130 of FIG. 11) positioned to correspond to each of both sides of the moving portion 1120. The inner surface of the side member 901 to which the flexible member 919 is attached may include an inclined surface (e.g., 1201b of FIG. 12).

According to various embodiments of the present disclosure, a structure of an inner surface of a flexible member and a side member to which the flexible member is attached may be disposed and applied to at least one hole existing at an outer surface of the electronic device, such as an insertion portion of a stylus pen, and a hole into which an ear jack is inserted in addition to a through hole.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the present disclosure, an electronic device can prevent a foreign material from entering through a through hole formed therein.

Although embodiments of the present disclosure have been described in detail hereinabove, it should be clearly understood that many variations and modifications of the basic inventive concepts herein described, which may appear to those skilled in the art, will still fall within the spirit and scope of the embodiments of the present disclosure as defined in the appended claims.

What is claimed is:

1. An electronic device, comprising:
   a housing comprising a front plate, a rear plate facing in an direction opposite to that of the front plate, and a side member enclosing a space between the front plate and the rear plate, wherein the side member comprises an opening portion and a through hole adjacent to the opening portion;
   a touch screen display disposed between the front plate and the rear plate;
   a tray configured to be inserted into the space through the opening portion and having a form to carry a subscriber identification module (SIM);
   a socket disposed within the space and configured to accept the tray through the opening portion;
   a tray detachment structure disposed adjacent to the socket within the space and configured to push the tray out of the socket when the tray detachment structure is pressed by an external object inserted through the through hole; and
   a flexible member, disposed within the space and attached to the side member on a periphery of the through hole, the flexible member comprising a portion blocking at least a portion of the through hole,
   wherein the portion of the flexible member is bent toward the tray detachment structure by being pushed from the external object inserted through the through hole.

2. The electronic device of claim 1, wherein the portion of the flexible member is bent toward the tray detachment structure such that the external object may come into contact with the tray detachment structure.

3. The electronic device of claim 1, wherein the flexible member comprises:
   a fixed portion attached and fixed to the side member on the periphery of the through hole; and
   a moving portion formed in a direction vertical to the fixed portion to block at least a portion of the through hole.

4. The electronic device of claim 3, wherein the moving portion is connected to a central portion of the fixed portion, and
   the fixed portion comprises a concave portion positioned to correspond to each of both sides of the moving portion.

5. The electronic device of claim 1, wherein the side member on the periphery of the through hole comprises a receiving groove configured to support the flexible member.

6. The electronic device of claim 1, wherein an inner surface of the side member to which the flexible member is attached comprises an inclined surface.

7. The electronic device of claim 6, wherein in the flexible member, a portion configured to block at least a portion of the through hole covers the through hole with being inclined by an angle of the inclined surface.

8. The electronic device of claim 3, wherein an inner surface of the side member to which the flexible member is attached comprises:
   a vertical surface to which the fixed portion is attached; and
   an inclined surface inclined by a specific angle from the vertical surface and disposed to face at least a portion of the moving portion.

9. The electronic device of claim 8, wherein at least a portion of the moving portion is bent at a boundary portion of the vertical surface and the inclined surface, and
   at least the remaining portions of the moving portion cover the through hole with being inclined by an angle of the inclined surface.

10. The electronic device of claim 1, further comprising a bracket disposed within the space and configured to support the touch screen display,
    wherein the bracket comprises a protruding portion protruded in a direction of the side member on the periphery of the through hole in order to fasten the flexible member by pressing the flexible member.

11. The electronic device of claim 10, further comprising:
    a first adhesive disposed between the flexible member and the side member on the periphery of the through hole; and
    a second adhesive disposed between the protruding portion of the bracket and the flexible member.

12. The electronic device of claim 1, wherein the flexible member comprises a plurality of cut portions cut in a plurality of directions around the through hole.

13. The electronic device of claim 12, wherein the plurality of cut portions blocks at least a portion of the through hole and bend when the external object is inserted through the through hole in a direction of the tray detachment structure so that the external object may come into contact with the tray detachment structure.

14. The electronic device of claim 12, wherein an entire area of the plurality of cut portions is larger than an area of the through hole.

15. The electronic device of claim 1, wherein the flexible member is made of one of rubber, polyethylene terephthalate (PET), and polycarbonate (PC).

\* \* \* \* \*